(12) United States Patent
Cheng

(10) Patent No.: US 6,871,389 B2
(45) Date of Patent: Mar. 29, 2005

(54) WORKPIECE FEEDER FOR A CUTTING METAL-WORKING MACHINE OR THE LIKE

(76) Inventor: Chin Chung Cheng, 58, Chien Kuo Road, Lu Chu Hsiang, Kaohsiung Hsien (TW)

(*) Notice: Subject to any disclaimer, the term of this patent is extended or adjusted under 35 U.S.C. 154(b) by 189 days.

(21) Appl. No.: 10/413,920

(22) Filed: Apr. 14, 2003

(65) Prior Publication Data

US 2004/0200051 A1 Oct. 14, 2004

(51) Int. Cl.[7] .................. B23P 23/23; B23B 13/10; B23Q 7/03; B23Q 7/08
(52) U.S. Cl. .................. 29/38 D; 29/38.9; 29/38 B; 82/125; 82/126; 414/18; 414/746.7
(58) Field of Search .................. 29/38 R, 38 B, 29/38 C, 38 D, 38.9; 82/124–127; 414/14–15, 18, 746.7, 746.4

(56) References Cited

U.S. PATENT DOCUMENTS

| | | | |
|---|---|---|---|
| 3,419,160 A | * | 12/1968 | Azuma .................. 82/125 |
| 3,612,298 A | * | 10/1971 | Azuma .................. 414/18 |
| 3,746,212 A | * | 7/1973 | Anderheggen et al. ..... 221/253 |
| 4,068,546 A | * | 1/1978 | Werkmeister .............. 82/127 |
| 4,388,039 A | * | 6/1983 | Schwarze ................ 414/745.9 |
| 4,638,693 A | * | 1/1987 | Sugimoto ................ 82/127 |
| 5,081,889 A | * | 1/1992 | Takano et al. ............ 82/125 |
| 6,119,330 A | * | 9/2000 | Cheng .................. 29/38 B |
| 6,446,533 B2 | * | 9/2002 | Miyano .................. 82/126 |

* cited by examiner

Primary Examiner—Erica Cadugan
(74) Attorney, Agent, or Firm—Pro-Techtor International Services

(57) ABSTRACT

A workpiece feeder adapted to feed workpieces to the processing main shaft of a cutting metal-working machine individually is disclosed to include a frame base adapted to carry individual workpieces, a conveyer, two striking blocks fixedly fastened to the conveyer, a power drive controlled by a control box to move workpieces to the feeding position one after another and to rotate the conveyer, causing the striking blocks to force individual workpieces to the processing main shaft of the cutting metal-working machine one after another through a workpiece guide.

3 Claims, 11 Drawing Sheets

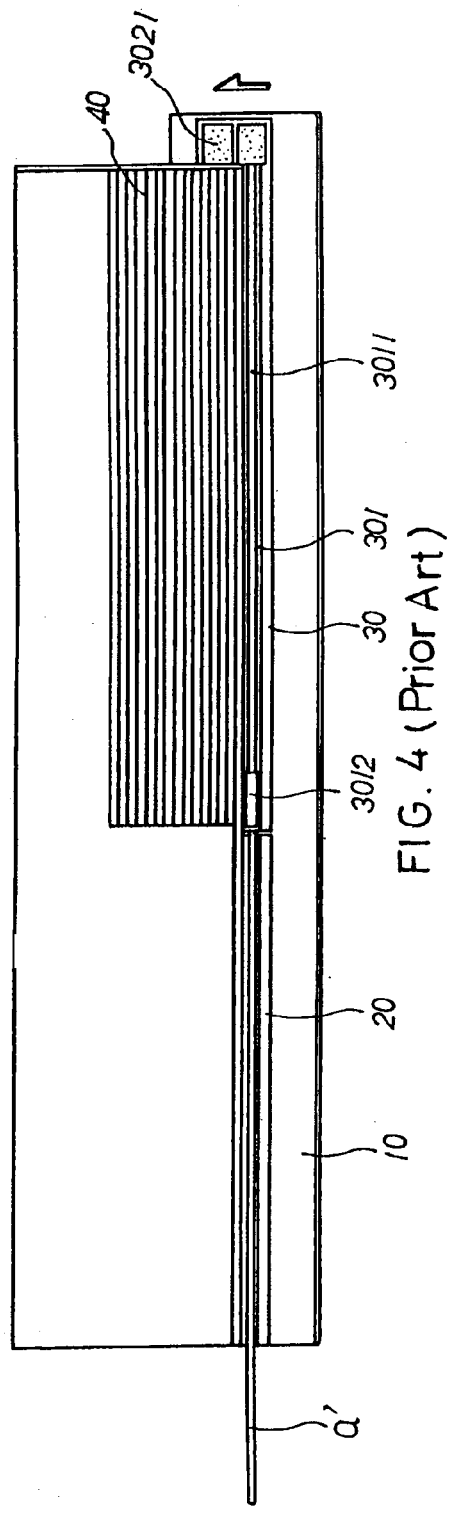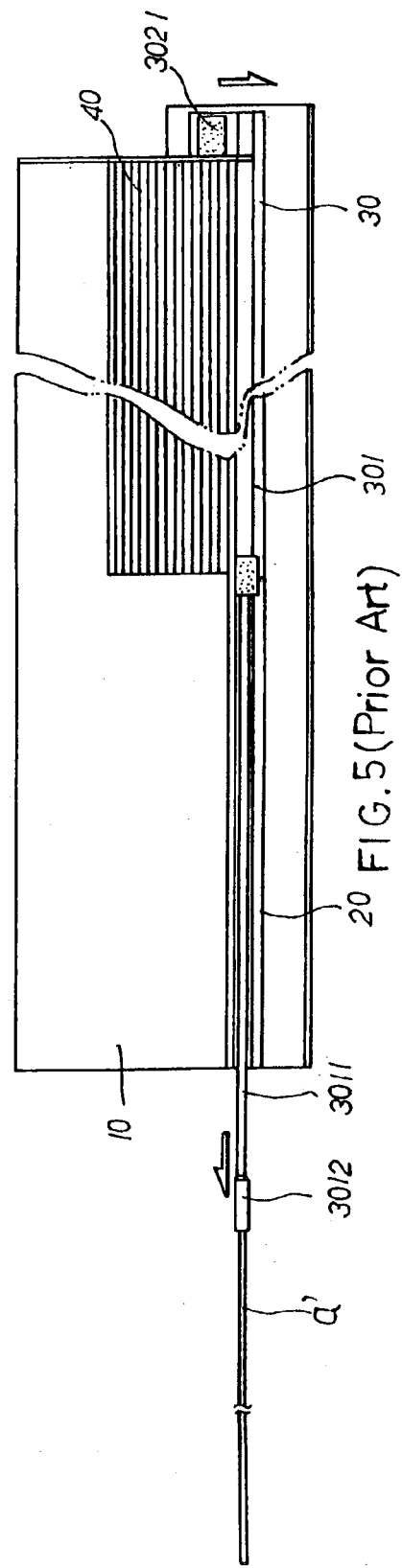
FIG. 4 (Prior Art)
FIG. 5 (Prior Art)

WORKPIECE FEEDER FOR A CUTTING METAL-WORKING MACHINE OR THE LIKE

BACKGROUND OF THE INVENTION

1. Field of the Invention

The present invention relates to a workpiece feeder and, more particularly, to a workpiece feeder adapted to feed individual workpieces to the processing main shaft of a cutting metal-working machine automatically and accurately.

2. Description of the Related Art

FIGS. 1~7 show a workpiece feeder adapted to feed individual workpieces to the processing main shaft 100' of a cutting metal-working machine for processing. The workpiece feeder comprises a frame base 10 having a feed table 40 and a front feed groove 20, and a movable carrier 30 horizontally movable provided at the front side of the frame base. The movable carrier 30 has a left receiving portion 301 and a right receiving portion 302 arranged in parallel The movable carrier 30 is reciprocated to alternatively shift the receiving portions 301 and 302 into alignment with the feed groove 20 for workpieces a' individually. A straight rod 3011 is forwardly movably provided in the left receiving portion 301. The straight rod 3011 has a front clamp 3012. A sliding block 3021 is provided at the rear side of the right receiving portion 302, and reciprocated in one direction. During the operation of the workpiece feeder, the movable carrier 30 to moved to a receiving position where the right receiving portion 302 is set into alignment with the feed groove 20, and then one workpiece "a'" is moved from the feed table 40 to the right receiving portion 302 (see FIGS. 1 and 2), and then the sliding block 3021 is moved forwards to push the received workpiece "a'" to the feed groove 20 and then returned, and then the movable carrier 30 is moved to let the right receiving portion 302 be received below the feed table 40 (see FIGS. 1, 4, and 5) and the left receiving portion 301 be in alignment with the feed groove 20, and then the front clamp 3012 is clamped on the rear end of the corresponding workpiece "a'", and then the straight rod 3011 is moved forwards to feed the workpiece "a'". After processing, the straight rod 3011 is returned to carry the residual butt "a'1" away from the cutting metal-working machine to the rear side of the feed groove 20 (see FIGS. 6 and 7). At this time, the clamp 3012 is opened to release the residual butt "a'1", enabling the residual butt "a'1" to be moved to a waste material collector 50 through a through hole 201 in the rear side of the feed groove 20. Thus, a feeding cycle is completed.

The workpiece feeding action of this design of workpiece feeder is complicated, resulting in slow workpiece feeding speed. Therefore, this design of workpiece feeder is suitable for use in a particular simple model of cutting metal-working machine, not suitable for use in a fully automatic cutting metal-working machine such as disclosed in U.S. Pat. No. 6,119,330.

Therefore, it is desirable to provide a workpiece feeder that eliminates the aforesaid drawbacks.

SUMMARY OF THE INVENTION

The present invention has been accomplished under the circumstances in view. It is one object of the present invention to provide a workpiece feeder, which automatically feeds individual workpieces to the cutting metal-working machine for processing one after another subject to a predetermined time interval. It is another object of the present invention to provide a workpiece feeder, which is practical to feed individual workpieces of different cross-sections. It is still another object of the present invention to provide a workpiece feeder, which has means to guide individual workpieces into the feeding position accurately, preventing the production of noises. To achieve these and other objects of the present invention, the workpiece feeder comprises a frame base, the frame base comprising a sloping feed table sloping in one direction at a top side, and a feed groove located on the lowest front side of the sloping table; a conveyer disposed adjacent to the feed groove, the conveyer comprising a front transmission wheel, a rear transmission wheel, and endless conveyer belt mounted on the front transmission wheel and the rear transmission wheel and coupled to the feed groove; a control box; a power drive controlled by the control box to move individual workpieces from the sloping feed table to the feed groove one after another subject to the predetermined time interval, and to rotate the conveyer; at least one striking block fixedly fastened to the endless belt and adapted to force individual workpieces out of the feed groove one after another to the processing main shaft of the cutting metal-working machine for processing; sensor means disposed at one side of the front transmission wheel in the path of the at least one striking box, and adapted to detect the movement of the at least one striking block and to output a signal to the control box for causing the control box to drive the power drive to move one individual workpiece out of the sloping feed table to the feed groove upon detection of the presence of one of the at least one striking block; and a workpiece guide adapted to guide individual workpieces to the processing machine shaft of the cutting metal-working machine individually.

BRIEF DESCRIPTION OF THE DRAWINGS

FIG. 4 is a schematic top view showing the operation of the prior art workpiece feeder (III).

FIG. 5 is a schematic top view showing the operation of the prior art workpiece feeder (IV).

DETAILED DESCRIPTION OF THE PREFERRED EMBODIMENT

Figure 1:
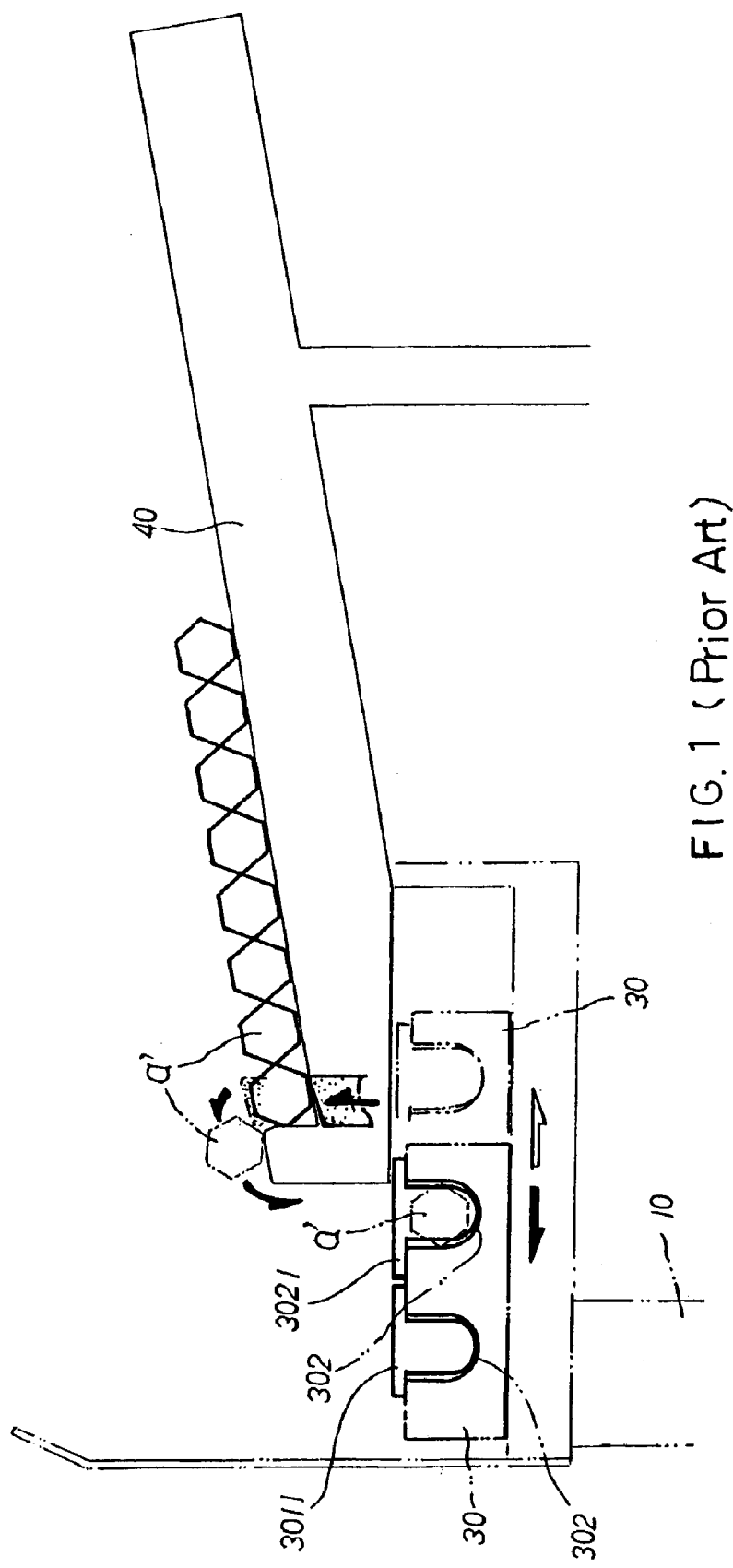
FIG. 1 is a schematic drawing showing the operation of a workpiece feeder according to the prior art.
Figure 2:
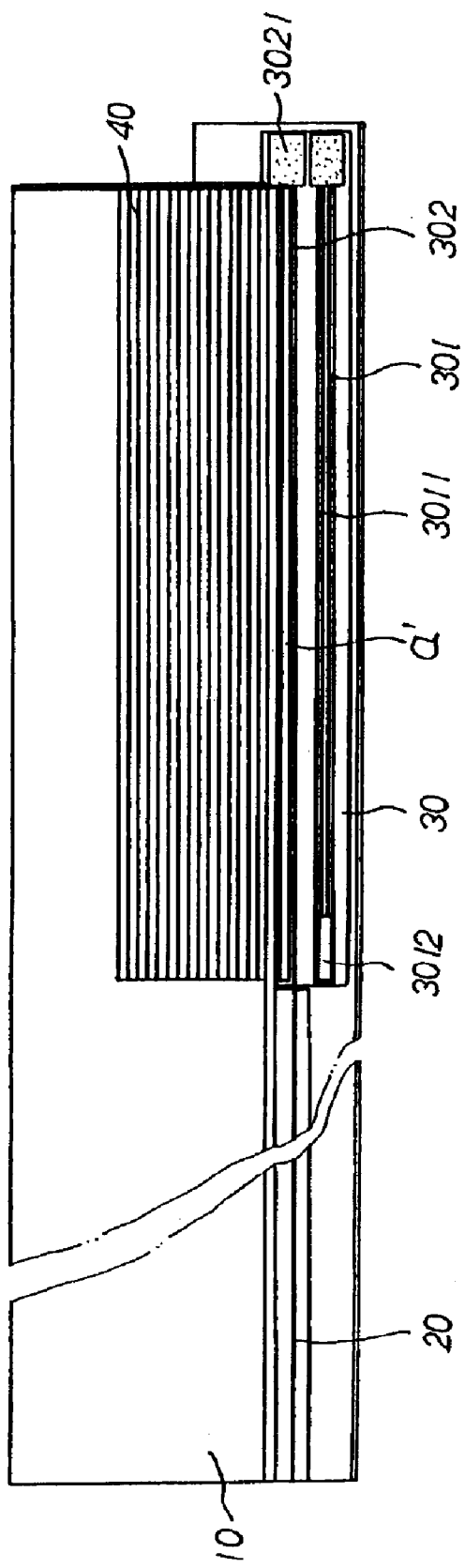
FIG. 2 is a schematic top view showing the operation of the prior art workpiece feeder (I).
Figure 3:
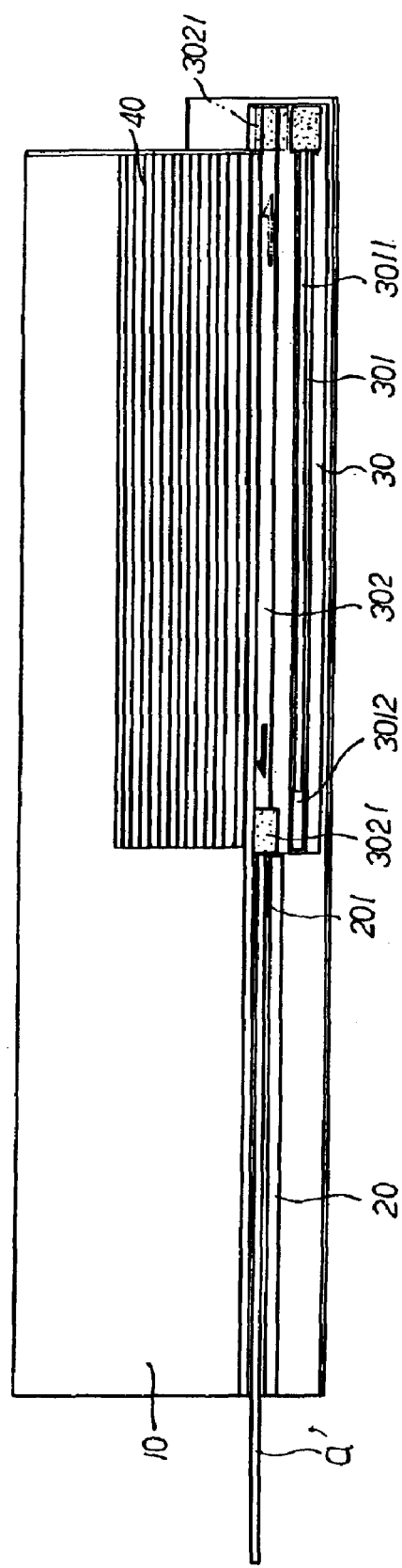
FIG. 3 is a schematic top view showing the operation of the prior art workpiece feeder (II).
Figure 6:
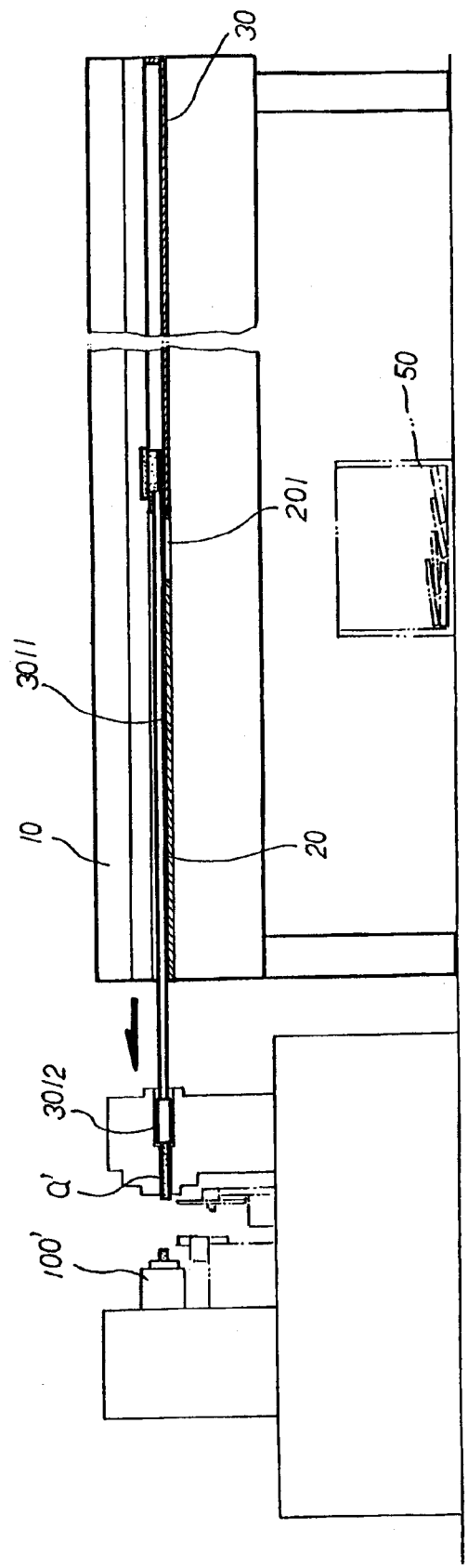
FIG. 6 is a schematic front view showing the operation of the prior art workpiece feeder (I).
Figure 7:
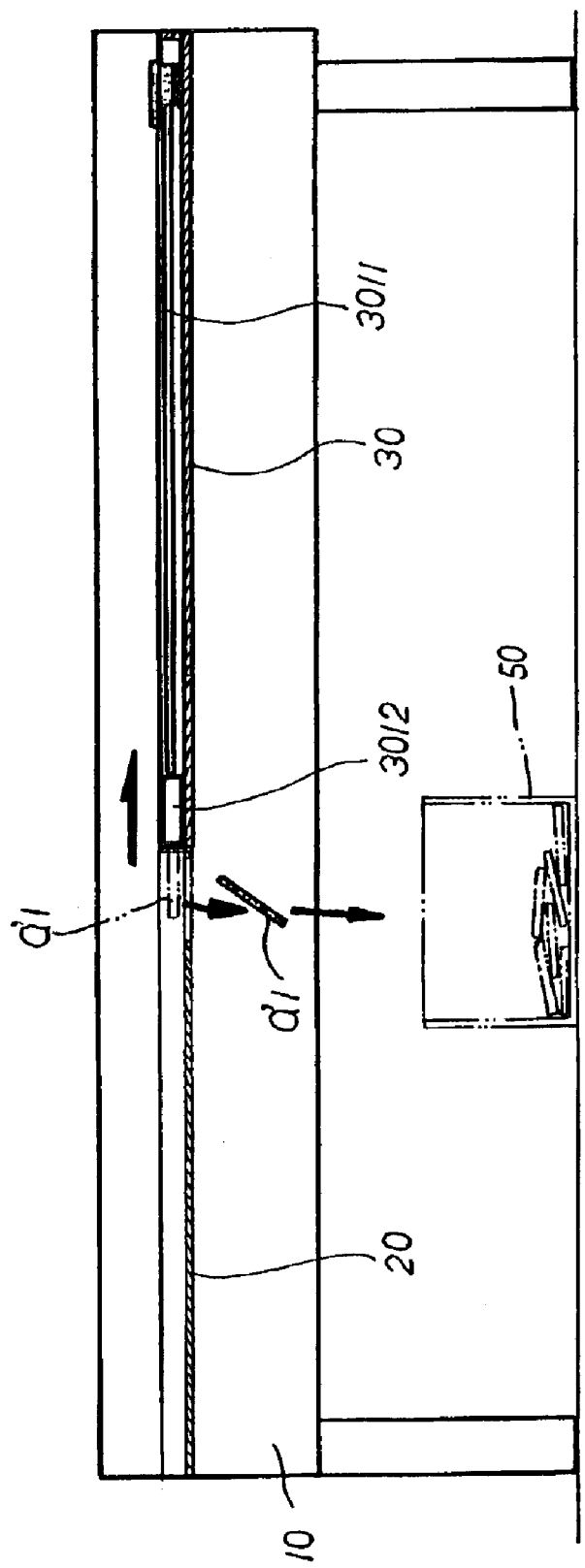
FIG. 7 is a schematic front view showing the operation of the prior art workpiece feeder (II).

Referring to FIGS. 8~11, a workpiece feeder is shown comprised of a frame base 1, a conveyer 2, a workpiece guide 3, power drive (not shown), and a control box 4.

Referring to FUIG. 9, the frame base 1 has a sloping feed table 11 sloping in one direction at the top, and a feed groove 12 located on the lowest front side of the sloping table 11.

Figure 8:
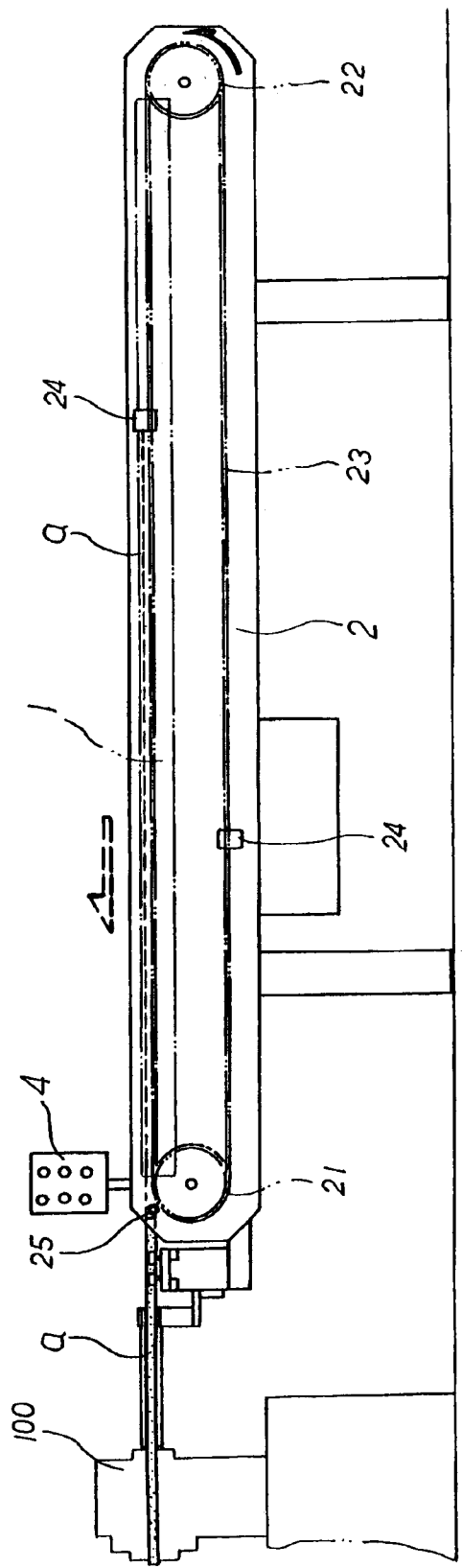
FIG. 8 is a schematic drawing showing the operation of a workpiece feeder according to the present invention.
Figure 9:
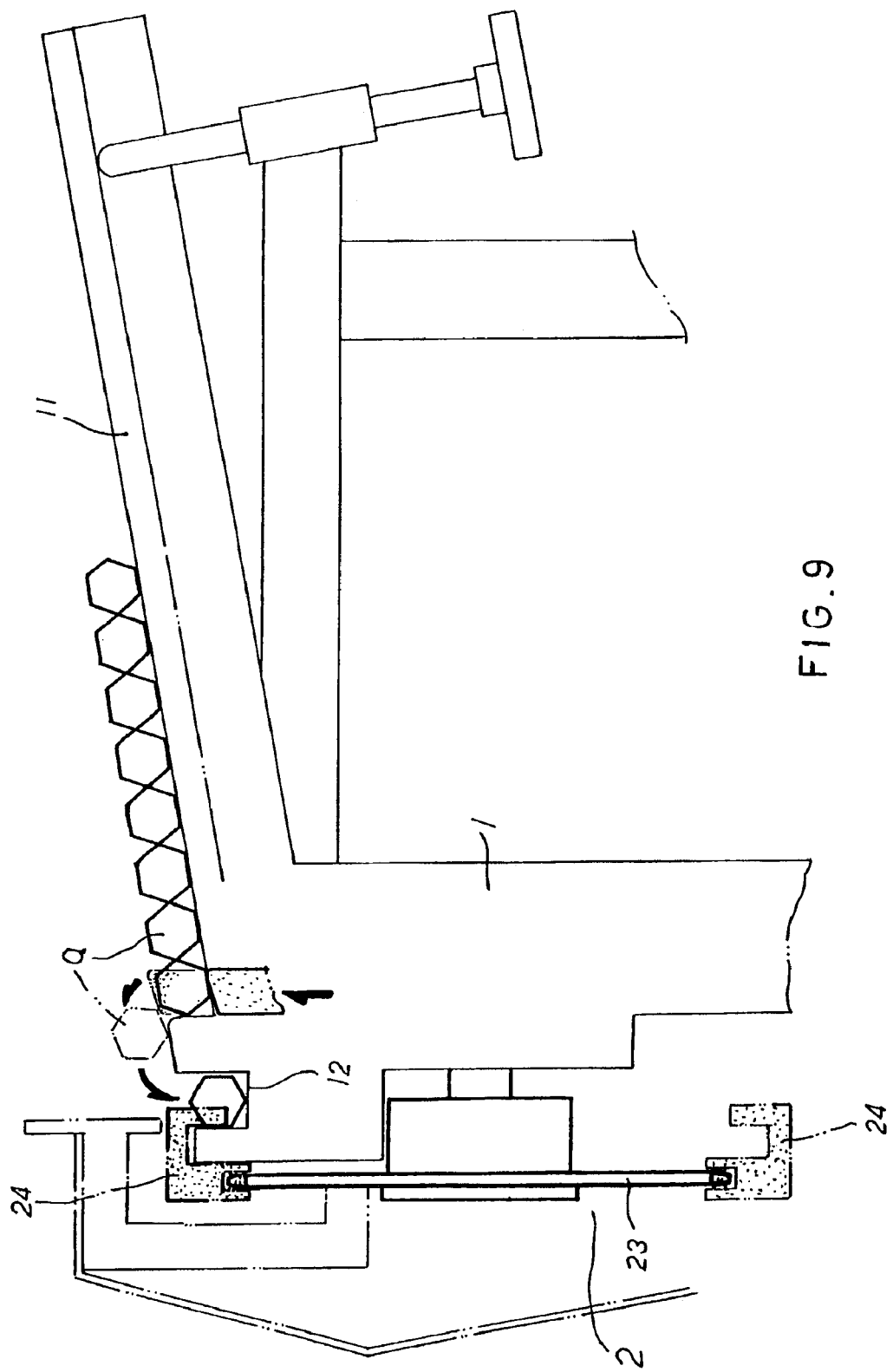
FIG. 9 is a schematic drawing of the workpiece feeder, showing an individual workpiece moved from the sloping feed table to the feed groove according to the present invention.

Referring to FIGS. 8 and 9, the conveyer 2 is disposed adjacent to the feed groove 12, comprising a front transmission wheel 21, a rear transmission wheel 22, a conveyer belt 23, two striking blocks 24, and a sensor 25. The conveyer belt 23 is an endless belt mounted on the front transmission wheel 21 and the rear transmission wheel 22. The striking blocks 24 are symmetrically and fixedly fastened to the conveyer belt 23 at two sides. The control box 4 controls the power drive to rotate the transmission wheels 21 and 22, thereby causing the striking blocks 24 to be moved with the conveyer belt 23 through feed groove 12. The sensor 25 is disposed in the path of the striking blocks 24 at one side of the front transmission wheel 21.

Figure 10:
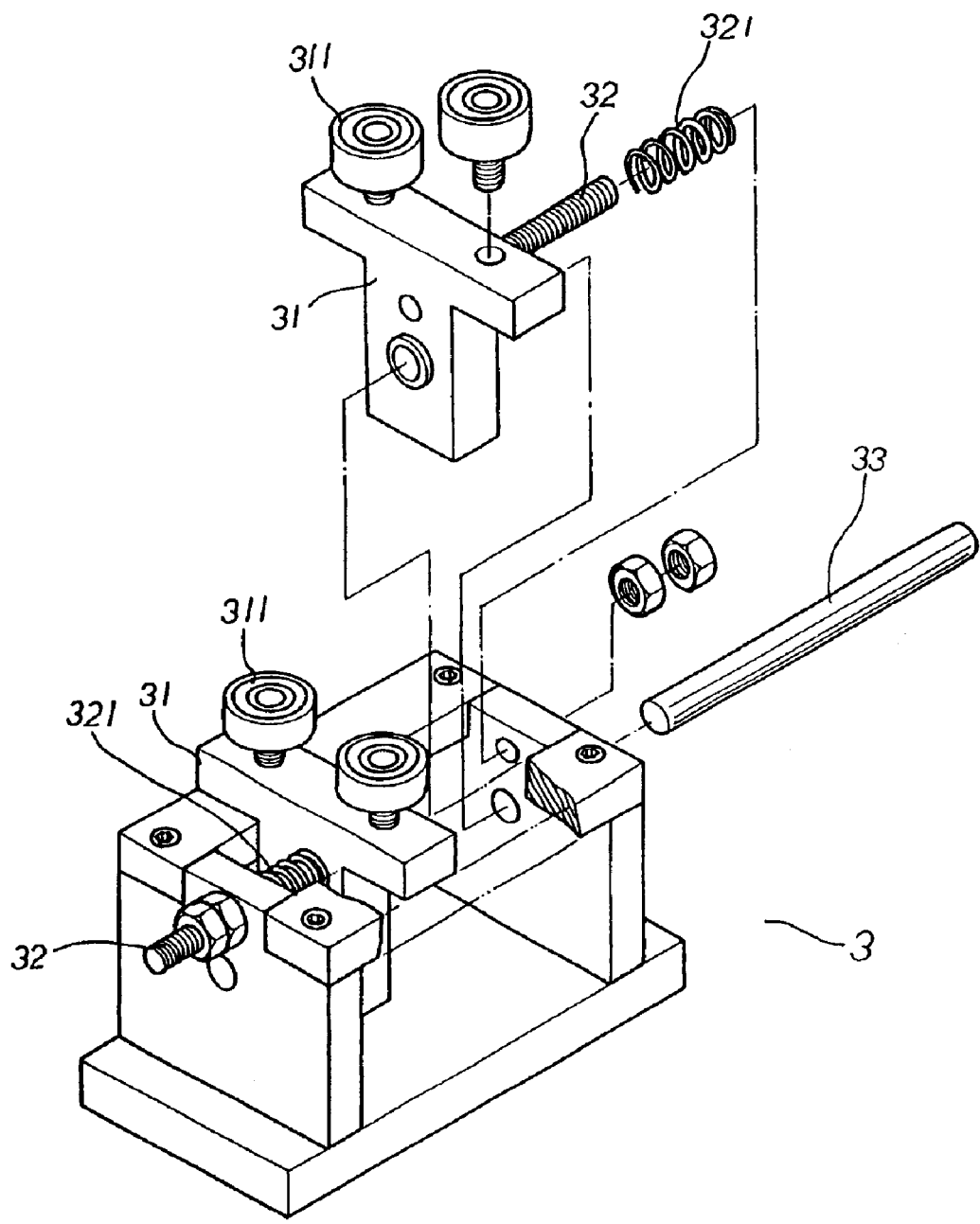
FIG. 10 is an exploded view of the workpiece guide according to the present invention.
Figure 11:
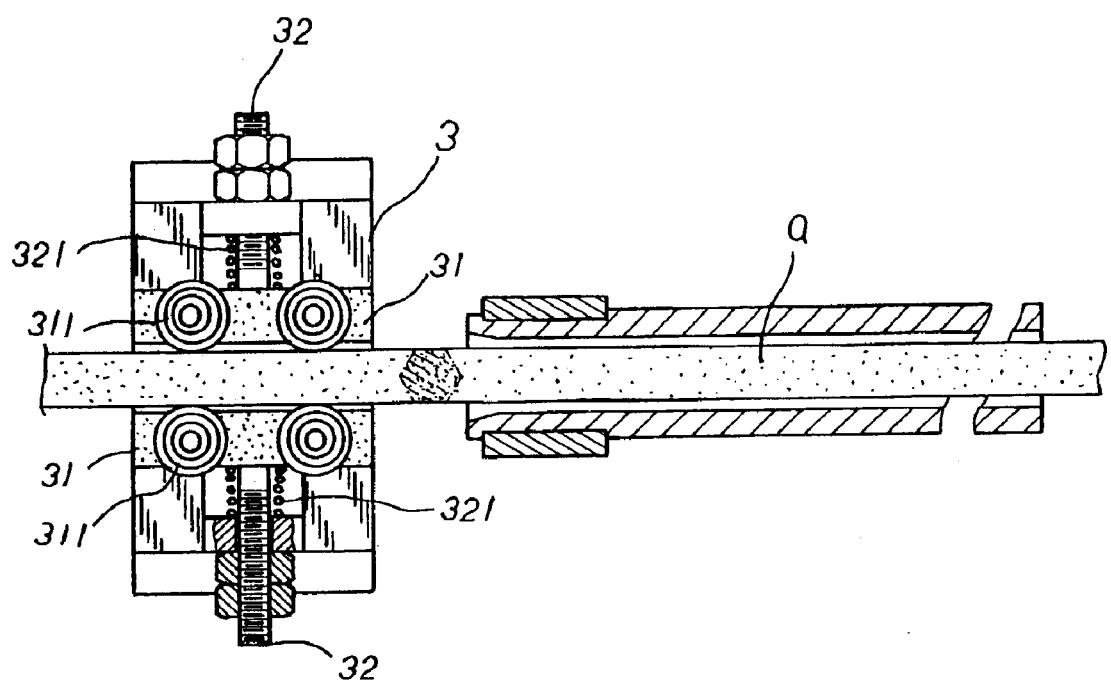
FIG. 11 is a top view of the workpiece guide according to the present invention.

Referring to FIGS. 8, 10, and 11, the workpiece guide 3 comprises two screws 32 arranged in parallel, two spring members 321 respectively mounted on the screws 32, and two positioning blocks 31 respectively pivotally mounted on the screws 32 and supported on the spring members 321, and a fixed guide rod 33 inserted through the positioning blocks 31 and adapted to guide movement of the positioning blocks 31 relative to each other. Each positioning block 31 comprises at least one, for example, two guide rollers 311 at the top. The screws 32 can be rotated to move the positioning blocks 31 relative each other, adjusting the pitch between the positioning blocks 31 for the insertion of an individual workpiece "a". The guide rollers 311 are biased when inserting one individual workpiece "a" in between the positioning blocks 31, for enabling the loading individual workpiece "a" to be accurately caught by the cutting metal-working machine's a processing main shaft 100 (see FIG. 8). The spring members 321 impart an inward pressure to the respective positioning blocks 31, causing the positioning blocks 31 to hold down the loaded workpiece "a" (FIG. 11). This design enables the workpiece guide 3 to carry any of a variety of workpieces of different cross-sections.

Figure 12:
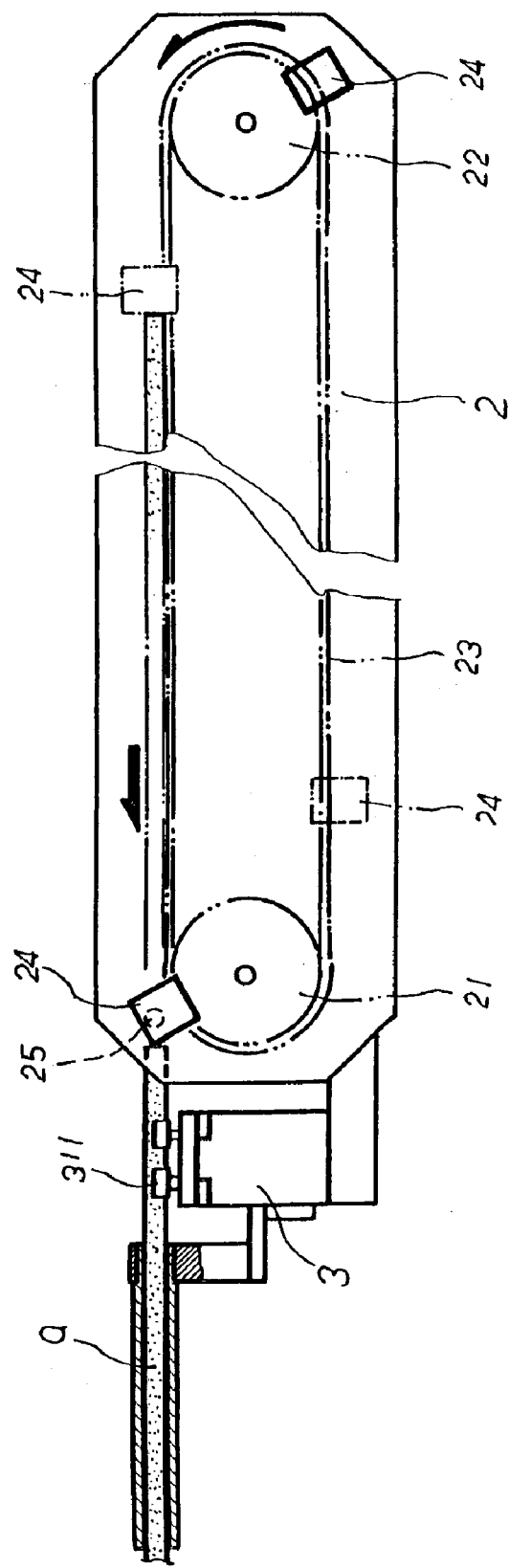
FIG. 12 is a schematic drawing showing the action of the conveyer according to the present invention.

Referring to FIGS. 8 and 12, the cutting metal-working machine started, the control box 4 drives the power drive to move individual workpieces "a" from the sloping feed table 11 to the feed groove 12 one after another subject to a predetermined time interval (the length of the individual workpieces "a" is about 2.5 m~3 m), and then drives the power drive to move the conveyer 2. When one striking block 24 moved to the feed groove 12, it pushes the respective individual workpiece "a" out of the feed groove 12, enabling the respective individual workpiece "a" to be caught by the processing main shaft 100. When the working striking block 24 moved out of the feed groove 12, the sensor 25 is induced to output a signal to the control box 4, thereby causing the control block 4 to drive the power drive to move a next individual workpiece "a" from the sloping feed table 11 to the feed groove 12 again, enabling the next individual workpiece "a" to be moved to the feed groove 12 and then delivered to the processing main shaft 100 for processing. This workpiece feeding procedure is repeated again and again.

As indicated above, the positioning blocks 31 of the workpiece guide 3 each have two guide rollers 311 disposed at the top and adapted to guide the loading individual workpiece "a" into position for catching by the processing main shaft 100 accurately and positively, the workpiece feeder fits individual workpieces (metal rods) of circular, rectangular, hexagonal, octagonal, or irregular cross-section.

Further, the spring members 321 force the positioning blocks 31 to hold the loading individual workpiece "a" positively in the feeding position.

While only one embodiment of the present invention has been shown and described, it will be understood that the drawings are designed for purposes of illustration only, and are not intended for use as a definition of the limits and scope of the invention disclosed.

What the invention claimed is:

1. A workpiece feeder used with a cutting metal working machine for feeding individual workpieces to a processing main shaft of said cutting metal working machine one after another subject to a predetermined time interval, said workpiece feeder comprising:

a frame base, said frame base comprising a sloping feed table sloping in one direction at a top side, said sloping feed table having a front side at the lowest point thereof, and a feed groove located on the lowest point of the front side of said sloping table;

a conveyer disposed adjacent to said feed groove, said conveyer comprising a front transmission wheel, a rear transmission wheel, and an endless conveyer belt mounted on said front transmission wheel and said rear transmission wheel and coupled to said feed groove;

a control box;

a power drive controlled by said control box to move individual workpieces from said sloping feed table to said feed groove one after another subject to said predetermined time interval, and to rotate said conveyer in a single direction;

at least one striking block fixedly fastened to said endless belt and adapted to force individual workpieces out of said feed groove one after another to the processing main shaft of said cutting metal-working machine for processing; and sensor means disposed at one side of said front transmission wheel in the path of said at least one striking block, and adapted to detect the movement of said at least one striking block and to output a signal to said control box for causing said control box to drive said power drive to move one individual workpiece out of said sloping feed table to said feed groove upon detection of the presence of one of said at least one striking block.

2. The workpiece feeder as claimed in claim 1, further comprising a workpiece guide adapted to guide individual workpieces to the processing main shaft of said cutting metal-working machine individually, said workpiece guide comprising two screws arranged in parallel, two positioning blocks respectively pivotally mounted on said screws and adapted to receive an individual workpiece in therebetween from said feed groove for enabling the received individual workpiece to be caught by the processing main shaft of said cutting metal-working machine for processing, two spring members adapted to force said positioning blocks toward each other, and a fixed guide rod inserted through said positioning blocks and adapted to guide movement of said positioning blocks along said guide rod relative to each other upon rotation of said screws.

3. The workpiece feeder as claimed in claim 2, wherein said positioning blocks each have at least one guide roller adapted to guide the received individual workpiece into position for catching by the processing main shaft of said cutting metal-working machine.

\* \* \* \* \*